United States Patent
Overton

(10) Patent No.: US 7,288,027 B2
(45) Date of Patent: Oct. 30, 2007

(54) CHEATER DETECTION IN A MULTI-PLAYER GAMING ENVIRONMENT

(75) Inventor: Adam J. Overton, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 458 days.

(21) Appl. No.: 10/447,483

(22) Filed: May 28, 2003

(65) Prior Publication Data

US 2004/0242321 A1 Dec. 2, 2004

(51) Int. Cl.
*A63F 13/00* (2006.01)

(52) U.S. Cl. .............................. 463/42; 463/1; 463/29; 463/40; 463/41; 463/43

(58) Field of Classification Search .................. 463/29, 463/40–42, 1
See application file for complete search history.

(56) References Cited

U.S. PATENT DOCUMENTS

| | | | |
|---|---|---|---|
| 5,970,143 A * | 10/1999 | Schneier et al. ............ 713/181 |
| 6,468,160 B2 | 10/2002 | Eliott | |
| 6,712,704 B2 | 3/2004 | Eliott | |
| 6,769,989 B2 | 8/2004 | Smith et al. | |
| 6,884,166 B2 * | 4/2005 | Leen et al. .................... 463/16 |
| 2003/0045359 A1 * | 3/2003 | Leen et al. .................... 463/42 |
| 2003/0216962 A1 * | 11/2003 | Heller et al. .................. 705/14 |
| 2004/0162137 A1 | 8/2004 | Eliott | |

OTHER PUBLICATIONS

Kirmse, Andrew; Kirmse Chris, "Security in Online Games", Jul. 7, 1997, Game Developer.*
Jianxin Jeff Yan et al., "Security Issues in Online Games", The Electronic Library, vol. 20 No. 2, 2002, pp. 125-133.
Jouni Smed et al., "Aspects of Networking in Multiplayer Computer Games", The Electronic Library, vol. 20, No. 2, 2002, pp. 87-97.

* cited by examiner

*Primary Examiner*—Ronald Laneau
*Assistant Examiner*—Ross A. Williams
(74) *Attorney, Agent, or Firm*—Lee & Hayes, PLLC

(57) ABSTRACT

A first instance of a game application is executed on a first computing system. The first computing system is coupled to communicate with a second computing system executing a second instance of the game application. Execution of the second instance of the game application is monitored to identify suspected cheating by the second instance of the game application.

51 Claims, 8 Drawing Sheets

CHEATER DETECTION IN A MULTI-PLAYER GAMING ENVIRONMENT

TECHNICAL FIELD

The systems and methods described herein relate to gaming systems and, more particularly, to detecting cheating in a multi-player gaming environment.

BACKGROUND

Traditionally, gaming systems accommodated a limited number of players, such as 1-4 players. A recent trend in gaming systems is to provide capabilities to facilitate gaming among multiple players over a network, such as Internet-based online gaming. These online gaming systems allow players to compete with other players, regardless of their geographic location.

Network-based or online gaming can be implemented in a centralized-server approach or a peer-to-peer approach. In the centralized-server approach, gaming systems connect to one or more centralized servers and interact with one another via the centralized server(s). In the peer-to-peer approach, gaming systems connect to one another and interact with one another directly. However, even in the peer-to-peer approach, a centralized server(s) may be employed to assist in the communication.

Certain game players attempt to cheat in multi-player gaming situations by, for example, modifying their copy of the game application such that the game application can exceed the normal operating characteristics of the game. For example, a character in the game may be made faster or may cheat by "looking" through opaque walls or objects. Cheating affects other game participants by reducing the entertainment they derive from the game application and affects the game developer that produced the game by potentially damaging the reputation of the game and possibly decreasing sales of the game.

Accordingly, it is desirable to identify and prevent such cheating such that all game participants are competing in a fair game.

SUMMARY

The systems and methods described herein allow an application, such as a game application, to monitor the activities reported by other game applications in a multi-player gaming environment, such as an online gaming environment. If any action taken by one or more other game applications is outside the capabilities of the game application, the monitoring game application reports the other game application as a cheater. The systems and methods described herein allows legitimate gaming participant software to report cheaters through, for example, the online gaming environment. Additionally, the source of each report is tracked such that a player's reports can be removed if it is later discovered that they were a cheater, thereby avoiding damage to the reputation of non-cheaters due to false reporting.

In a particular embodiment, a first instance of a game application is executed on a first computing system. The first computing system is coupled to communicate with a second computing system executing a second instance of the game application. Execution of the second instance of the game application is monitored to identify suspected cheating by the second instance of the game application.

BRIEF DESCRIPTION OF THE DRAWINGS

Similar reference numbers are used throughout the figures to reference like components and/or features.

DETAILED DESCRIPTION

The following discussion is directed to a system and method for detecting suspected cheaters in a multi-player gaming environment and analyzing reports of suspected cheaters. The discussion assumes that the reader is familiar with basic cryptography principles, such as encryption, decryption, authentication, hashing, and digital signatures. For a basic introduction to cryptography, the reader is directed to a text written by Bruce Schneier and entitled, "Applied Cryptography: Protocols, Algorithms, and Source Code in C," published by John Wiley & Sons, copyright 1994 (second edition 1996), which is hereby incorporated by reference.

Discussions herein refer to a "computing system", "gaming system" and a "game console" as example systems on which game applications may be executed. In other embodiments, the methods for detecting suspected cheaters can be performed by any computing device, such as a personal computer, laptop computer, handheld computer, personal digital assistant (PDA), set top box, cellular phone, and the like. Particular examples discussed herein are related to online gaming environments. However, the systems and methods discussed herein may be applied to any multi-player gaming environment in which two or more players compete against each other.

Figure 1:
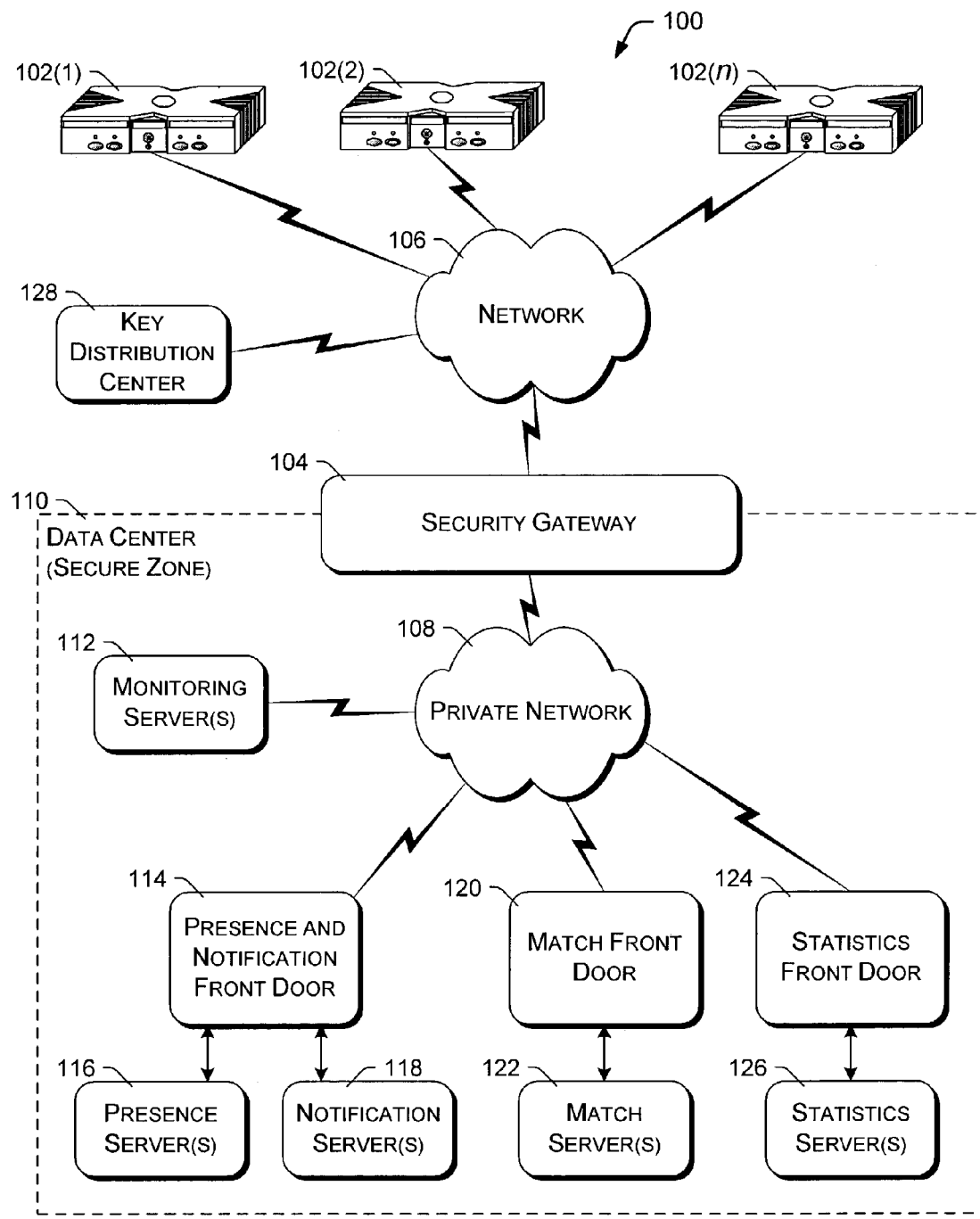
FIG. 1 is a block diagram of an example online gaming environment.

FIG. 1 is a block diagram of an example online gaming environment 100. Multiple game consoles 102(1), 102(2), ..., 102(n) are coupled to a security gateway 104 via a network 106. Network 106 represents any one or more of a variety of conventional data communications networks. Network 106 will typically include packet switched networks, but may also include circuit switched networks. Network 106 can include wired and/or wireless portions. In one example implementation, network 106 includes the Internet and may optionally include one or more local area networks (LANS) and/or wide area networks (WANs). At least a part of network 106 is a public network, which refers to a network that is publicly-accessible. Virtually anyone can access the public network.

In some situations, network 106 includes a LAN (e.g., a home network), with a routing device situated between game console 102 and security gateway 104. This routing device may perform network address translation (NAT), allowing the multiple devices on private network 108 (or a LAN) to share the same IP address on the Internet, and also operating as a firewall to protect the device(s) from access by malicious or mischievous users via the Internet.

Security gateway 104 operates as a gateway between public network 106 and private network 108. Private network 108 can be any of a wide variety of conventional networks, such as a local area network. Private network 108, as well as other devices discussed in more detail below, is within a data center 110 that operates as a secure zone. Data center 110 is made up of trusted devices communicating via trusted communications. Thus, encryption and authentication within secure zone 110 is not necessary. The private nature of network 108 refers to the restricted accessibility of network 108—access to network 108 is restricted to only certain individuals (e.g., restricted by the owner or operator of data center 110).

Security gateway 104 is a cluster of one or more security gateway computing devices. These security gateway computing devices collectively implement security gateway 104. Security gateway 104 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 110 are: one or more monitoring servers 112; one or more presence and notification front doors 114, one or more presence servers 116, and one or more notification servers 118 (collectively implementing a presence and notification service); one or more match front doors 120 and one or more match servers 122 (collectively implementing a match service); and one or more statistics front doors 124 and one or more statistics servers 126 (collectively implementing a statistics service). The servers 116, 118, 122, and 126 provide services to game consoles 102, and thus can be referred to as service devices. Other service devices may also be included in addition to, and/or in place of, one or more of the servers 116, 118, 122, and 126. Additionally, although only one data center is shown in FIG. 1, alternatively multiple data centers may exist with which game consoles 102 can communicate. These data centers may operate independently or alternatively may operate collectively (e.g., to make one large data center available to game consoles 102).

Game consoles 102 are situated remotely from data center 110, and access data center 110 via network 106. A game console 102 desiring to communicate with one or more devices in data center 110 establishes a secure communication channel between the console 102 and security gateway 104. Game console 102 and security gateway 104 encrypt and authenticate data packets being passed back and forth, thereby allowing the data packets to be securely transmitted between them without being understood by any other device that may capture or copy the data packets without breaking the encryption. Each data packet communicated from game console 102 to security gateway 104, or from security gateway 104 to game console 102 can have data embedded therein. This embedded data is referred to as the content or data content of the packet. Additional information may also be inherently included in the packet based on the packet type (e.g., a heartbeat packet or traversal packet, discussed in more detail below).

The secure communication channel between a console 102 and security gateway 104 is based on a security ticket. Console 102 authenticates itself and the current user(s) of console 102 to a key distribution center 128 and obtains, from key distribution center 128, a security ticket. Console 102 then uses this security ticket to establish the secure communication channel with security gateway 104. In establishing the secure communication channel with security gateway 104, the game console 102 and security gateway 104 authenticate themselves to one another and establish a session security key that is known only to that particular game console 102 and the security gateway 104. This session security key is used as a basis to encrypt data transferred between the game console 102 and the security gateway cluster 104, so no other devices (including other game consoles 102) can read the data. The session security key is also used as a basis to authenticate a data packet as being from the security gateway 104 or game console 102 that the data packet alleges to be from. Thus, using such session security keys as a basis, secure communication channels can be established between the security gateway 104 and the various game consoles 102.

Once the secure communication channel is established between a game console 102 and the security gateway 104, encrypted data packets can be securely transmitted between the two. When the game console 102 desires to send data to a particular service device in data center 110, the game console 102 encrypts the data and sends it to security gateway 104 requesting that it be forwarded to the particular service device(s) targeted by the data packet. Security gateway 104 receives the data packet and, after authenticating and decrypting the data packet, encapsulates the data content of the packet into another message to be sent to the appropriate service via private network 108. Security gateway 104 determines the appropriate service for the message based on the requested service(s) targeted by the data packet.

Similarly, when a service device in data center 110 desires to communicate data to a game console 102, the data center sends a message to security gateway 104, via private network 108, including the data content to be sent to the game console 102 as well as an indication of the particular game console 102 to which the data content is to be sent. Security gateway 104 embeds the data content into a data packet, and then encrypts the data packet so it can only be decrypted by the particular game console 102 and also authenticates the data packet as being from the security gateway 104.

Although discussed herein as primarily communicating encrypted data packets between security gateway 104 and a game console 102, alternatively some data packets may be partially encrypted (some portions of the data packets are encrypted while other portions are not encrypted). Which portions of the data packets are encrypted and which are not can vary based on the desires of the designers of data center 110 and/or game consoles 102. For example, the designers may choose to allow voice data to be communicated among consoles 102 so that users of the consoles 102 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, the data packet is still authenticated.

Each security gateway device in security gateway 104 is responsible for the secure communication channel with typically one or more game consoles 102, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 112 operate to inform devices in data center 110 of an unavailable game console 102 or an unavailable security gateway device of security gateway 104. Game consoles 102 can become unavailable for a variety of different reasons, such as a hardware or software failure, the console being powered-down without logging out of data center 110, the network connection cable to console 102 being disconnected from console 102, other network problems (e.g., the LAN that the console 102 is on malfunctioning), etc. Similarly, a security gateway device of security gateway 104 can become unavailable for a variety of different reasons, such as hardware or software failure, the device being powered-down, the network connection cable to the device being disconnected from the device, other network problems, etc.

Each of the security gateway devices in security gateway 104 is monitored by one or more monitoring servers 112, which detect when one of the security gateway devices becomes unavailable. In the event a security gateway device becomes unavailable, monitoring server 112 sends a message to each of the other devices in data center 110 (servers, front doors, etc.) that the security gateway device is no longer available. Each of the other devices can operate based on this information as it sees fit (e.g., it may assume that particular game consoles being managed by the security gateway device are no longer in communication with data center 110 and perform various clean-up operations accordingly). Alternatively, only certain devices may receive such a message from the monitoring server 112 (e.g., only those devices that are concerned with whether security gateway devices are available).

Security gateway 104 monitors the individual game consoles 102 and detects when one of the game consoles 102 becomes unavailable. When security gateway 104 detects that a game console is no longer available, security gateway 104 sends a message to monitoring server 112 identifying the unavailable game console. In response, monitoring server 112 sends a message to each of the other devices in data center 110 (or alternatively only selected devices) that the game console is no longer available. Each of the other devices can then operate based on this information as it sees fit.

Presence server(s) 116 holds and processes data concerning the status or presence of a given user logged in to data center 110 for online gaming. Notification server(s) 118 maintains multiple queues of outgoing messages destined for a player logged in to data center 110. Presence and notification front door 114 is one or more server devices that operate as an intermediary between security gateway 104 and servers 116 and 118. One or more load balancing devices (not shown) may be included in presence and notification front door 114 to balance the load among the multiple server devices operating as front door 114. Security gateway 104 communicates messages for servers 116 and 118 to the front door 114, and the front door 114 identifies which particular server 116 or particular server 118 the message is to be communicated to. By using front door 114, the actual implementation of servers 116 and 118, such as which servers are responsible for managing data regarding which users, is abstracted from security gateway 104. Security gateway 104 can simply forward messages that target the presence and notification service to presence and notification front door 114 and rely on front door 114 to route the messages to the appropriate one of server(s) 116 and server(s) 118.

Match server(s) 122 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 120 includes one or more server devices (and optionally a load balancing device(s)) and operates to abstract match server(s) 122 from security gateway 104 in a manner analogous to front door 114 abstracting server(s) 116 and server(s) 118.

Statistics server(s) 126 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 126 includes one or more server devices (and optionally a load balancing device(s)) and operates to abstract statistics server(s) 126 from security gateway 104 in a manner analogous to front door 114 abstracting server(s) 116 and server(s) 118.

Thus, it can be seen that security gateway 104 operates to shield devices in the secure zone of data center 110 from the untrusted, public network 106. Communications within the secure zone of data center 110 need not be encrypted, as all devices within data center 110 are trusted. However, any information to be communicated from a device within data center 110 to a game console 102 passes through security gateway cluster 104, where it is encrypted in such a manner that it can be decrypted by only the game console 102 targeted by the information.

In a particular embodiment, the systems and methods discussed herein may be implemented in a peer-to-peer architecture. In a peer-to-peer architecture, each computing system or gaming system has similar capabilities and responsibilities for initiating, maintaining and terminating communications with other systems. The peer-to-peer architecture differs from a client/server architecture where certain computing systems are dedicated to serving other computing systems.

Figure 2:
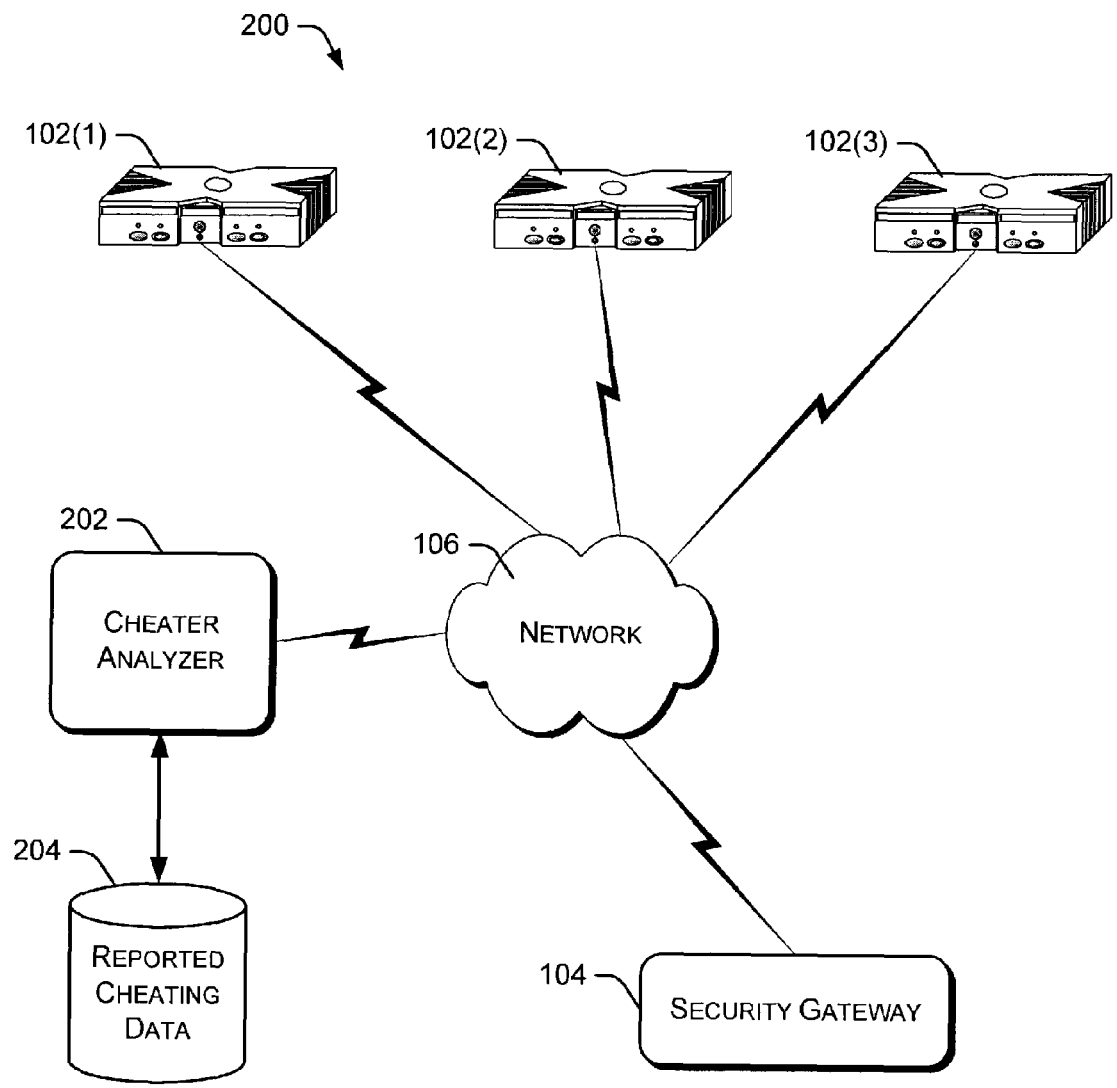
FIG. 2 is a block diagram illustrating specific components of a system for detecting and analyzing cheating in a multi-player gaming environment.

FIG. 2 is a block diagram illustrating specific components of a system 200 for detecting and analyzing cheating in a multi-player gaming environment. Certain components (such as components of FIG. 1) are omitted from FIG. 2 for purposes of explanation. In a particular embodiment, the components shown in FIG. 2 are used in combination with the components of FIG. 1 to provide a full-featured online gaming environment. The components of FIG. 2 that are common to FIG. 1 share common reference numbers.

FIG. 2 illustrates three game consoles 102(1), 102(2) and 102(3) coupled to network 106. In a particular embodiment, any number of game consoles 102 may be coupled to network 106 such that players of any two or more game consoles can participate in a multi-player game using, for example, the online gaming service discussed above. A cheater analyzer 202 is coupled to network 106 and to a storage device 204 that stores reports of suspected cheating received from game consoles 102, as discussed below. Cheater analyzer 202 analyzes data stored in storage device 204 to identify cheaters (or game consoles that have been modified to cheat) and prevent cheaters from using the online gaming service. Security gateway 104 is coupled to network 106 and provides access to various online gaming features discussed above.

The systems and methods discussed herein identify cheaters without relying on software of a compromised system. If a particular system, such as a game console or other computing device, is compromised, that system cannot be expected to identify itself as cheating. Therefore, the systems and methods described herein use innocent gaming software to monitor the activities reported by the other participants of the game. If any action is taken that is outside the capabilities of the game, the gaming software reports those actions as suspected cheating to an online gaming service, a cheater analyzer, or similar system.

Typical multi-player games report data to other game participants (also referred to as "players") by broadcasting information such as position, velocity, heading, angular velocity, actions (e.g., jump or kick), etc. for each character or object in a game. The other game participants use this information to update the position and activity of other characters and objects in the game. Timestamp information may also be transmitted to account for delays in sending data between game participants.

Figure 3:
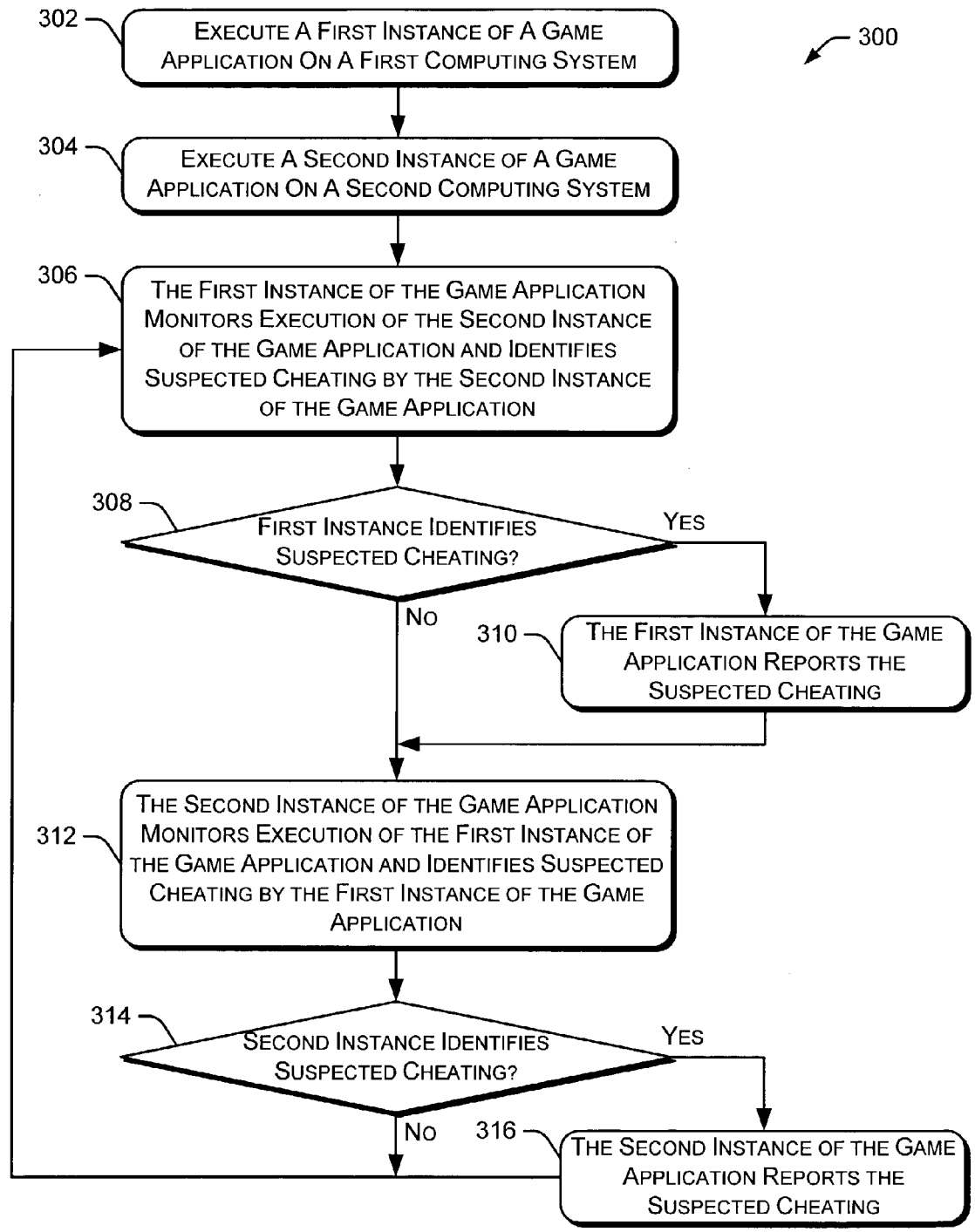
FIG. 3 is a flow diagram illustrating an embodiment of a procedure for monitoring one or more game applications to identify and report suspected cheating.

FIG. 3 is a flow diagram illustrating an embodiment of a procedure 300 for monitoring one or more game applications to identify and report suspected cheating. Initially, procedure 300 executes a first instance of a game application on a first computing system (block 302). Next, a second instance of the game application is executed on a second computing system (block 304). The first instance of the game application monitors execution of the second instance of the game application and identifies suspected cheating by the second instance of the game application (block 306).

If the first instance of the game application identifies suspected cheating (block 308), the procedure branches to block 310 where the first instance of the game application reports the suspected cheating to the online gaming service, a cheater analyzer, or similar system.

The procedure 300 continues as the second instance of the game application monitors execution of the first instance of the game application and identifies suspected cheating by the first instance of the game application (block 312). If the second instance of the game application identifies suspected cheating (block 314), the procedure branches to block 316 where the second instance of the game application reports the suspected cheating to the online gaming service, a cheater analyzer, or similar system. The procedure then returns to block 306. The procedure continues as the first instance of the game application and the second instance of the game application monitor each other's actions to identify and report suspected cheating.

The example of FIG. 3 discusses two instances of a game application monitoring each other's execution. In alternate embodiments, any number of instances of a game application can monitor the execution of all other instances of the game application. In another embodiment, a separate game monitoring application may be running on one or more computing systems concurrently with the game application. The game monitoring application identifies suspected cheating by instances of the game application executing on other computing systems and reports the suspected cheating to the online game service, a cheater analyzer, etc.

Various types of cheating may occur during execution of a game application. For example, in a first-person shooter game, a common "aim-bot" cheat may be used to quickly position the cheating player's character so that they automatically shoot their enemy. These "aim-bots" typically cause the cheating player's character to turn (or otherwise move) faster than is possible using a game controller. One or more other game applications running on other gaming systems can report that player as a suspected cheater to the online gaming service or other repository of suspected cheater data.

Other types of cheating include moving a character or object faster than permitted by the game and moving a character or object in a manner that is not permitted by the game, such as walking across water or throwing an object through a solid wall. Other types of cheating include suspicious behavior, such as a first game character accurately tracking another character or object that is obscured by a wall or other solid object. Under normal circumstances, the character or object could not be tracked behind a wall because the character or object would not be visible to the first character. The first character should not be able to track the other character or object unless the first character is cheating.

Figure 4:
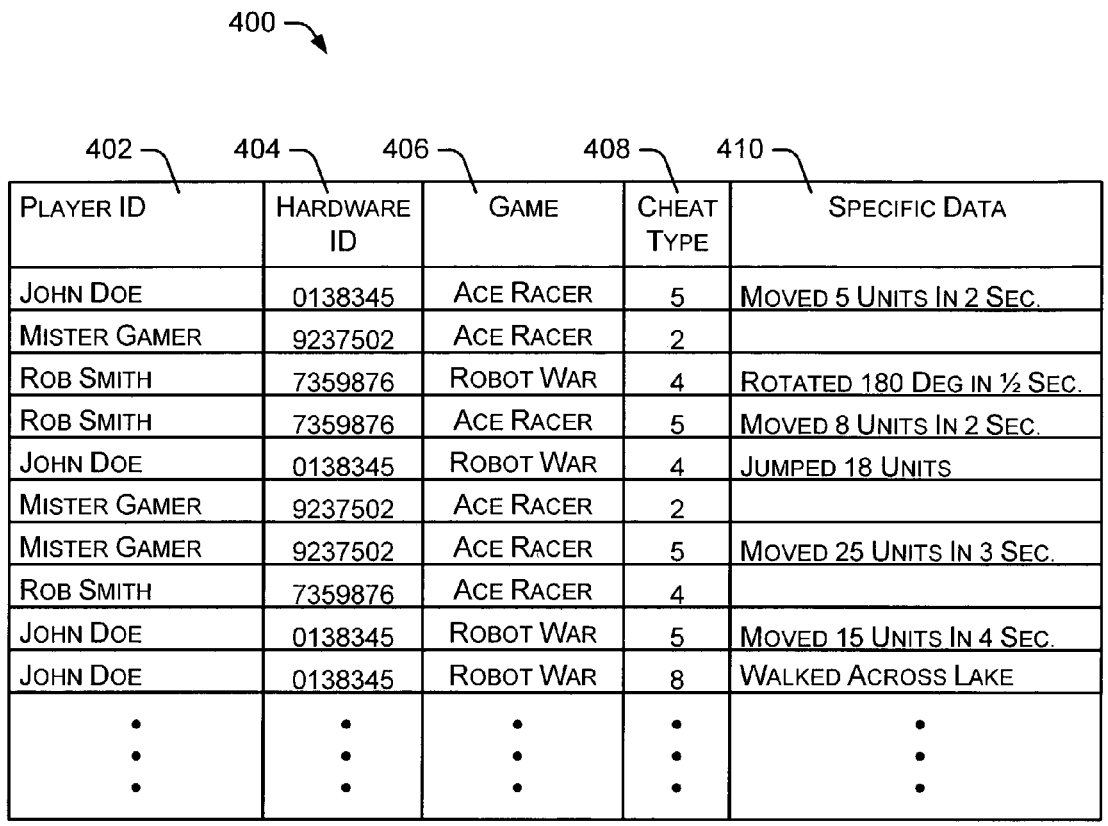
FIG. 4 illustrates an example of data contained in a database of reported cheating data.

FIG. 4 illustrates an example of data contained in a database 400 of reported cheating data (also referred to as "suspected cheating data"). A first column 402 identifies the player ID associated with the instance of the game suspected of cheating (i.e., the player believed to be cheating). A second column 404 identifies the gaming system (e.g., the game console ID) executing the instance of the game suspected of cheating. This information is useful, because a game executed by the gaming system may have been modified such that any player playing the game on the gaming system will be "cheating". Thus, an online gaming system may want to prevent any player from playing the game on a gaming system that has been identified as capable of cheating at a particular game.

Database 400 also includes a third column 406 that identifies the game being played when the suspected cheating was detected. A fourth column 408 identifies an optional type of suspected cheating that was detected. A cheating analysis system may categorize cheating into several different types (referred to as "cheat types"). These types of cheating include, for example, moving faster than the game allows, moving or manipulating characters in a manner that is not supported by the game, and performing acts that are not supported by the game or not available to the player performing the act. In alternate embodiments, column 408 is omitted from database 400.

The last column 410 shown in FIG. 4 identifies specific data associated with the suspected cheating. As discussed above, the cheat type can be identified in column 408. The data in column 410 further describes the suspected cheating. For example, in the first row of database 400, the suspected cheating is cheat type "5". The additional data in column 410, "Moved 5 Units in 2 Sec.", describes specific movement of a character or object in the game that caused the reporting of the suspected cheating. Certain suspected cheating reports may identify a cheat type, but not provide any additional specific data. In other embodiments, a suspected cheating report may not identify a cheat type, but does provide specific data regarding the suspected cheating. Other embodiments may not identify a cheat type or any specific data regarding the suspected cheating.

The embodiment of FIG. 4 illustrates example data that may be included in a particular database. In alternate embodiments, one or more groups of data may be removed from the database and one or more groups of data may be added to the database. For example, an alternate embodiment of FIG. 4 may include additional columns for storing data regarding the identity of the player and the identity of the hardware generating the suspected cheating report. Particular examples discussed herein refer to specific types of cheating (such as moving too fast or performing actions not supported by the game). These examples represent particular types of cheating activities for purposes of explanation. The systems and methods discussed herein may be applied to any type of cheating among one or more participants in any type of game application.

Figure 5:
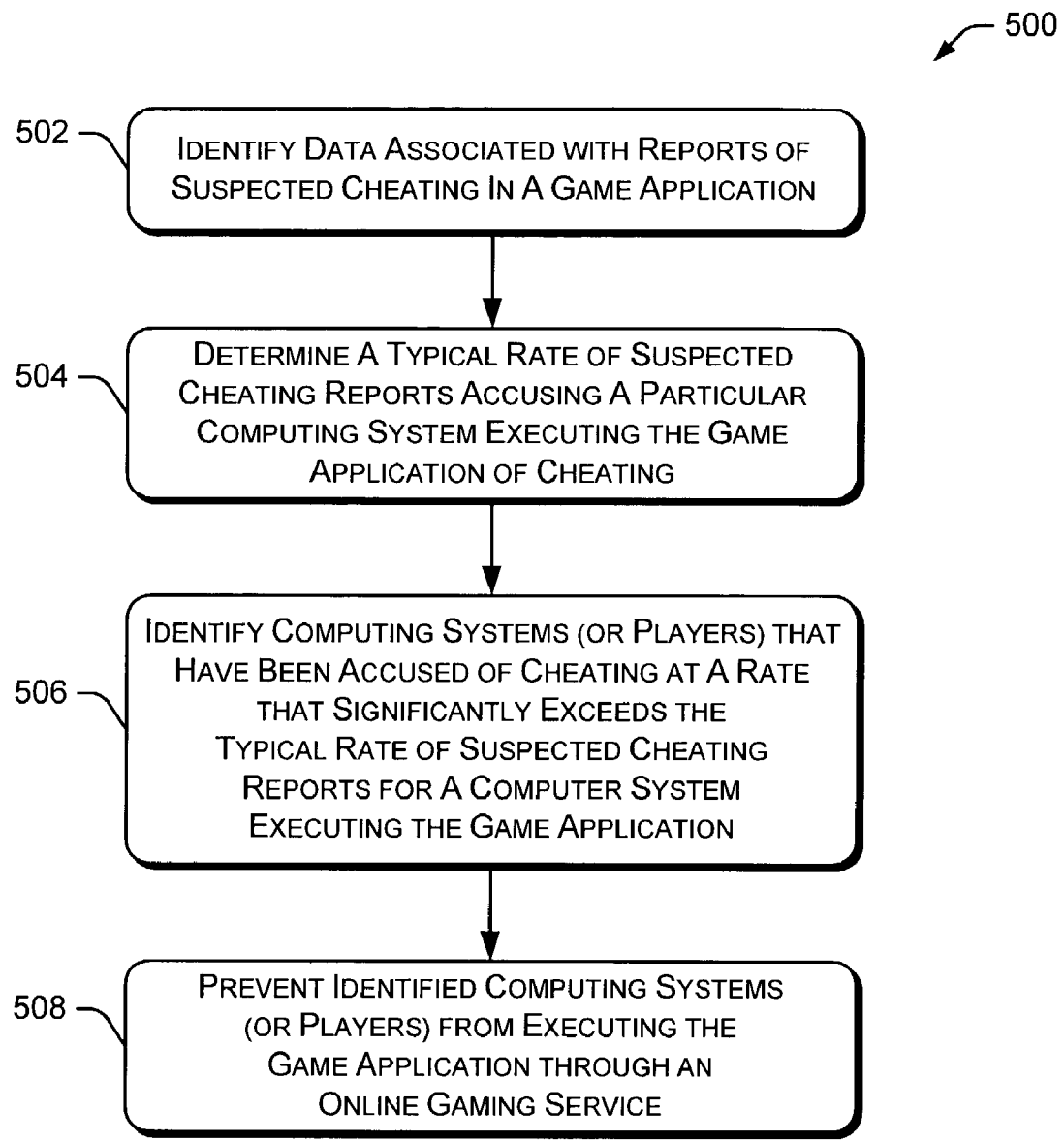
FIG. 5 is a flow diagram illustrating an embodiment of a procedure for identifying cheaters based on reported cheating data.

FIG. 5 is a flow diagram illustrating an embodiment of a procedure 500 for identifying cheaters based on reported cheating data. Initially, the procedure identifies data associated with reports of suspected cheating in a game application (block 502). For example, data may be obtained from a storage device (such as storage device 204 in FIG. 2) that stores reported cheating data. The procedure then determines a typical rate of suspected cheating reports accusing a particular computing system executing the game application of cheating (block 504).

Procedure 500 continues by identifying computing systems (or players) that have been accused of cheating at a rate that significantly exceeds the typical rate of suspected cheating reports for a computer system executing the game application (block 506). For example, if a particular computing system (or player) is accused of cheating at a rate twice that of the typical rate, that particular computing system (or player) may be considered a cheater. A cheating accusation rate that "significantly exceeds" the typical rate can be defined by, for example, an administrator of an online gaming service. In particular embodiments, a cheating accusation rate that "significantly exceeds" the typical rate can range from ten percent above the typical rate to several orders of magnitude above the typical rate.

At block 508, the procedure prevents identified computing systems (and/or players) from executing the game application through an online gaming service or other multi-player gaming environment. In another embodiment, the procedure prevents identified computing systems (and/or players) from participating in any games through an online service or other multi-player gaming environments.

An administrator of an online gaming service can set various parameters and conditions for preventing computing systems and/or players identified as cheaters from participating in games through the online gaming service. For example, one administrator may want to prevent computing systems and/or players from participating in the online gaming service if there is a very high certainty that they are cheating. In this example, the administrator may require suspected cheating reports at a rate at least twice that of the typical rate and may require suspected cheating reports from at least five different players. The administrator may also require a minimum number of suspected cheating reports, such as at least 30 suspected cheating reports within the last two weeks.

In another example, an administrator may require a lesser degree of certainty regarding cheating to prevent computing systems and/or players from participating in the online gaming service. In this example, the administrator may require suspected cheating reports at a rate at least 50% higher than the typical rate and may require suspected cheating reports from at least four different players. The administrator may also require a minimum number of suspected cheating reports, such as at least 40 suspected cheating reports within the last month.

Other factors that an administrator may consider when identifying cheaters include a greater percentage of opponents than average reporting player as a cheater, whether the player was previously identified as a cheater in a different game, how recently the suspected cheating reports were submitted (e.g., older cheating reports are given less weight), and an above-average success rate in games. An administrator may also consider the amount of time a player plays over a multi-day period. For example, if a player plays 22 hours a day for five consecutive days, the player may be an algorithm or other automated system rather than a human player.

Administrators of online gaming services may also use statistical analysis of the reported cheating data to identify cheaters. For example, in a particular system, nearly all players are accused of cheating at a rate that falls within a particular range (e.g., between one and two accusations per ten hours of game play). The accusations that fall within that range are considered to be a result of lost data packets, network congestion, etc. If a player is accused of cheating at a rate that falls outside the particular range (e.g., twenty accusations per ten hours of game play), they are likely to be cheating.

A typical game application will generate some "false" suspected cheating reports due to, for example, communication delays in transmitting data between the multiple players, lost data, and the like. False suspected cheating reports are those reports that accuse a player of cheating when the player is not actually cheating. To properly analyze suspected cheating report data, it is desirable to determine a typical rate of false suspected cheating reports. This typical rate of false suspected cheating reports can be determined, for example, by monitoring reports received during the first few weeks or the first few months after a game application is released by a game developer. During these first few weeks or first few months, cheating is unlikely because it generally takes time for a cheater to understand a new game application and determine how to create cheats for that game application. Therefore, this early data provides a typical rate of false suspected cheating reports.

Figure 6:
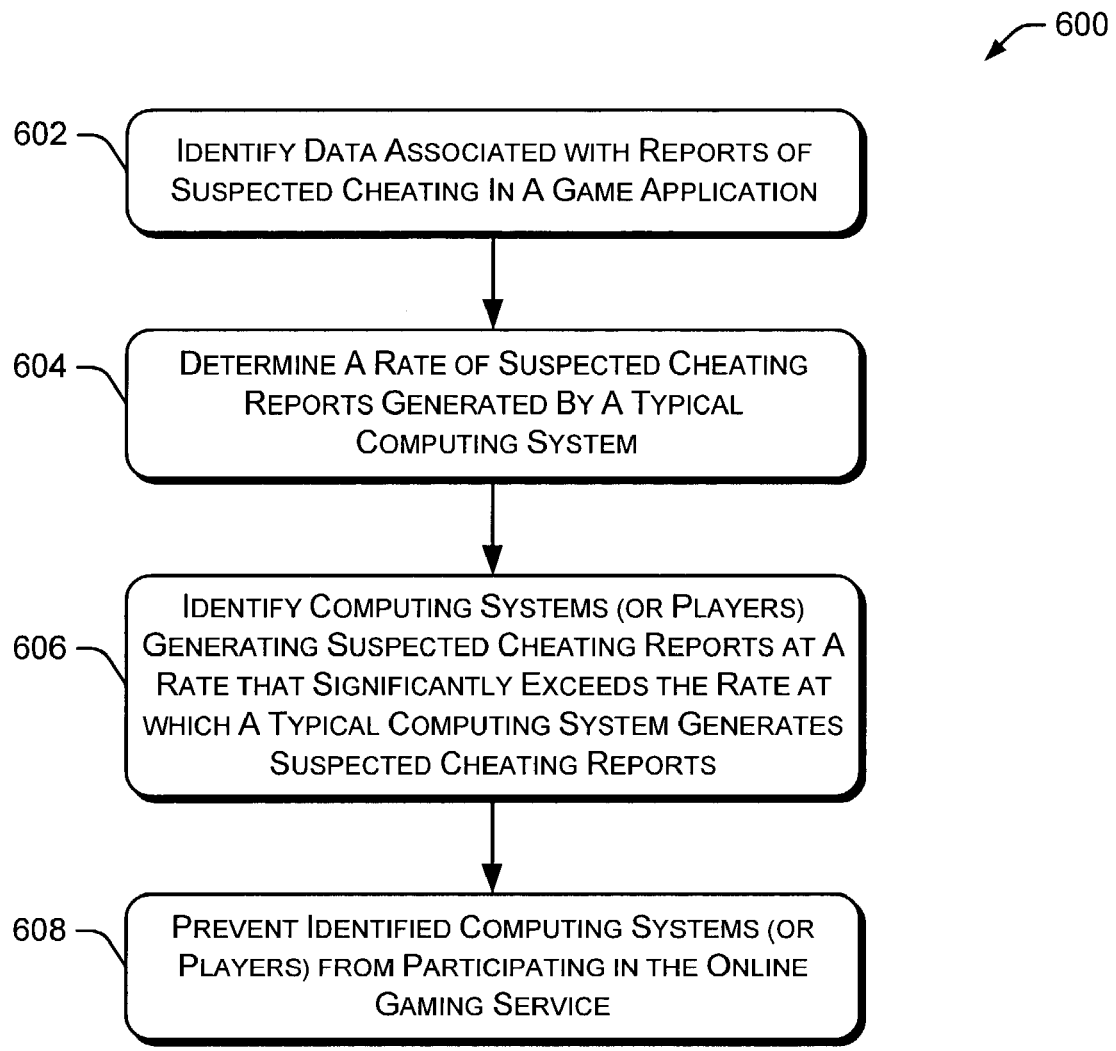
FIG. 6 is a flow diagram illustrating an embodiment of another procedure for identifying cheaters based on reported cheating data.

FIG. 6 is a flow diagram illustrating an embodiment of another procedure 600 for identifying cheaters based on reported cheating data. Initially, the procedure identifies data associated with reports of suspected cheating in a game application (block 602). The procedure then determines a rate of suspected cheating reports generated by a typical computing system (block 604). Next, procedure 600 identifies computing systems (or players) generating suspected cheating reports at a rate that significantly exceeds the rate at which a typical computing system generates suspected cheating reports (block 606). The identified computing systems (and/or players) are then prevented from participating in the online gaming service (block 608).

The above procedure discourages players from intentionally making false reports of suspected cheating. If a particular player (or computing system) submits a disproportionately high number of suspected cheating reports, they may be prevented from accessing the online gaming service. Alternatively, the particular player may be suspended from using the online gaming service for a period of time, such as two weeks or a month.

When a player's suspected cheating reports are determined to be false, those reports are deleted or otherwise identified as false in the reported cheating data store. This practice prevents damage to the reputation of a non-cheater due to false reporting.

The procedures for identifying cheaters discussed above with respect to FIGS. 5 and 6 may be performed at periodic intervals, such as every few minutes or every few hours. Alternatively, these procedures can be performed each time a player seeks to access an online gaming service. In this situation, the procedures analyze data associated with the particular player seeking access to the online gaming service.

The procedures discussed above with respect to FIGS. 5 and 6 can be performed without the knowledge of the game participants. For example, the procedures may be executed automatically by a game console (or other computing system) without requiring any player input or player interaction. Thus, the cheater detection systems and methods discussed herein can operate without interfering with the normal activities of the game players. Additionally, since each player (or computing system) monitors other players, a cheater can disable the reporting functionality of their own computing system, but they will still be reported as a cheater by the other players.

In a particular embodiment, players (or computing systems) are limited to reporting other players in an active game. In this embodiment, a player cannot report another player as a cheater if they are not currently participating in the same game as the reporting player. This limitation helps prevent one or more players from intentionally ruining the reputation of another player, because the other player must be a game participant.

Particular embodiments discussed herein prevent certain players from participating in one or more online games if they are identified as a cheater. In alternate embodiments, the cheating player may also be "punished" by deleting the cheating player's high scores from a leader board associated with the game in which the player cheated. Alternatively, the cheating player's high scores may be deleted from all leader boards maintained by an online gaming system. Further, the cheating player may be prevented from having scores posted on any leader board for a period of time, such as one month. The "punishments" for cheating discussed herein are merely examples of possible actions against cheating players. Alternate embodiments may impose one or more other actions against cheating players.

Figure 7:
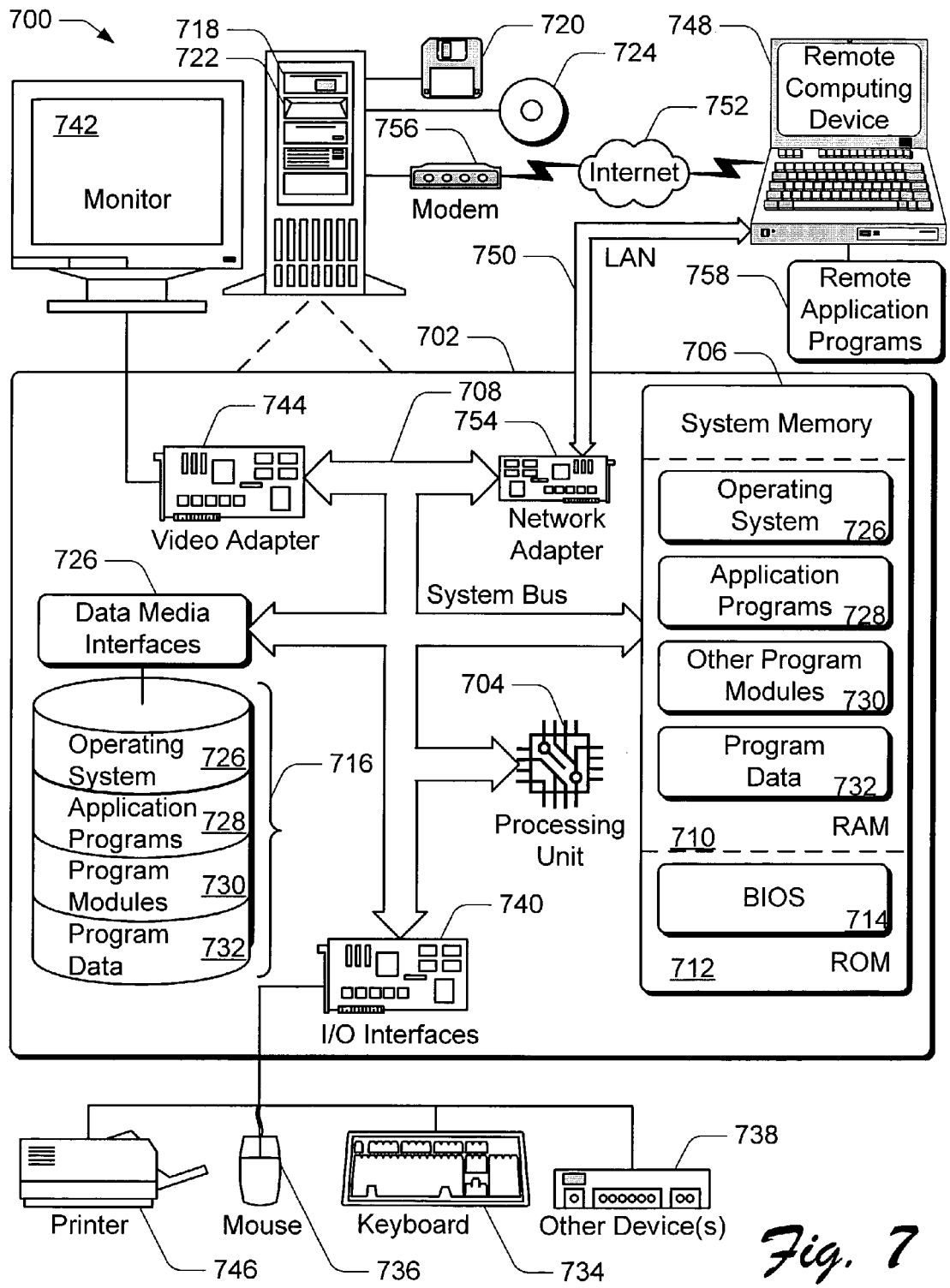
FIG. 7 illustrates a general computer environment, which can be used to implement the techniques described herein.

FIG. 7 illustrates a general computer environment 700, which can be used to implement the techniques described herein. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the example computer environment 700.

Computer environment 700 includes a general-purpose computing device in the form of a computer 702. Computer 702 can be, for example, a statistics front door 124, a match front door 120, a presence and notification front door 114, or a monitoring server 112 of FIG. 1, or a cheater analyzer 202 of FIG. 2. The components of computer 702 can include, but are not limited to, one or more processors or processing units 704 (optionally including a cryptographic processor or co-processor), a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer readable media. Such media can be any available media that is accessible by computer 702 and includes both volatile and non-volatile media, removable and non-removable media.

The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may implement all or part of the resident components that support the distributed file system.

A user can enter commands and information into computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, game console, and the like. The remote computing device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components such as the operating system are illustrated herein as discrete blocks, although it is recognized that such programs and components reside at various times in different storage components of the computing device 702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Figure 8:
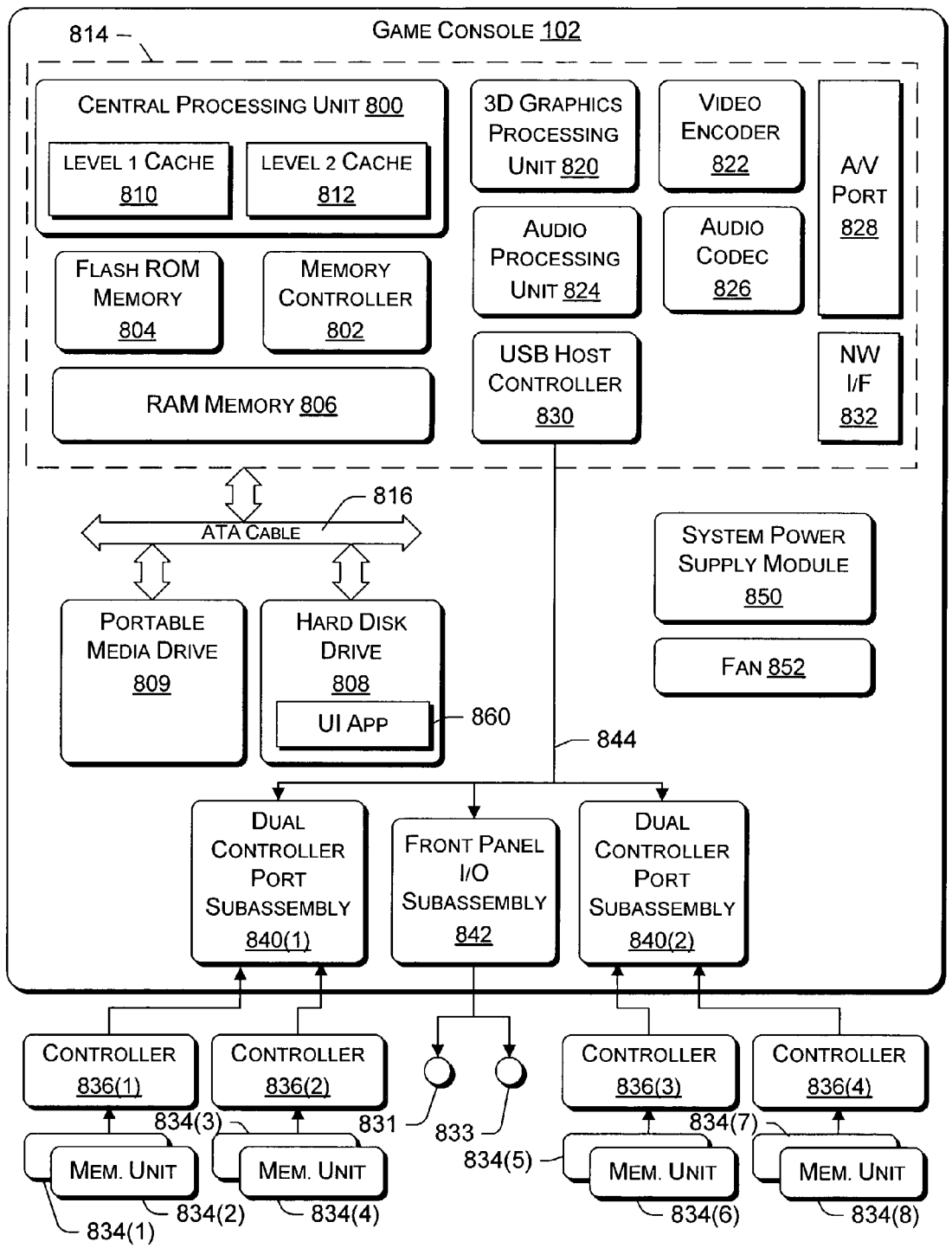
FIG. 8 shows functional components of a game console in more detail.

FIG. 8 shows functional components of a game console 102 in more detail. Game console 102 has a central processing unit (CPU) 800 and a memory controller 802 that facilitates processor access to various types of memory, including a flash ROM (Read Only Memory) 804, a RAM (Random Access Memory) 806, a hard disk drive 808, and a portable media drive 809. CPU 800 is equipped with a level 1 cache 810 and a level 2 cache 812 to temporarily store data and hence reduce the number of memory access cycles, thereby improving processing speed and throughput.

CPU 800, memory controller 802, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, CPU 800, memory controller 802, ROM 804, and RAM 806 are integrated onto a common module 814. In this implementation, ROM 804 is configured as a flash ROM that is connected to the memory controller 802 via a PCI (Peripheral Component Interconnect) bus and a ROM bus (neither of which are shown). RAM 806 is configured as multiple DDR SDRAM (Double Data Rate Synchronous Dynamic RAM) that are independently controlled by the memory controller 802 via separate buses (not shown). The hard disk drive 808 and portable media drive 809 are connected to the memory controller via the PCI bus and an ATA (AT Attachment) bus 816.

A 3D graphics processing unit 820 and a video encoder 822 form a video processing pipeline for high speed and high resolution graphics processing. Data is carried from the graphics processing unit 820 to the video encoder 822 via a digital video bus (not shown). An audio processing unit 824 and an audio codec (coder/decoder) 826 form a corresponding audio processing pipeline with high fidelity and stereo processing. Audio data is carried between the audio processing unit 824 and the audio codec 826 via a communication link (not shown). The video and audio processing pipelines output data to an A/V (audio/video) port 828 for transmission to the television or other display. In the illustrated implementation, the video and audio processing components 820-828 are mounted on the module 814.

Also implemented on the module 814 are a USB host controller 830 and a network interface 832. The USB host controller 830 is coupled to the CPU 800 and the memory controller 802 via a bus (e.g., PCI bus) and serves as host for the peripheral controllers 836(1)-836(4). The network interface 832 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 840(1) and 840(2), with each subassembly supporting two game controllers 836(1)-836(4). A front panel I/O subassembly 842 supports the functionality of a power button 831 and a media drive eject button 833, as well as any LEDs (light emitting diodes) or other indicators exposed on the outer surface of the game console. The subassemblies 840(1), 840(2), and 842 are coupled to the module 814 via one or more cable assemblies 844.

Eight memory units 834(1)-834(8) are illustrated as being connectable to the four controllers 836(1)-836(4), i.e., two memory units for each controller. Each memory unit 834 offers additional storage on which games, game parameters, and other data may be stored. When inserted into a controller, the memory unit 834 can be accessed by the memory controller 802.

A system power supply module 850 provides power to the components of the game console 102. A fan 852 cools the circuitry within the game console 102.

A console user interface (UI) application 860 is stored on the hard disk drive 808. When the game console is powered on, various portions of the console application 860 are loaded into RAM 806 and/or caches 810, 812 and executed on the CPU 800. Console application 860 presents a graphical user interface that provides a consistent user experience when navigating to different media types available on the game console.

Game console 102 implements a cryptography engine to perform common cryptographic functions, such as encryption, decryption, authentication, digital signing, hashing, and the like. The cryptography engine may be implemented as part of the CPU 800, or in software stored on the hard disk drive 808 that executes on the CPU, so that the CPU is configured to perform the cryptographic functions. Alternatively, a cryptographic processor or co-processor designed to perform the cryptographic functions may be included in game console 102.

Game console 102 may be operated as a standalone system by simply connecting the system to a television or other display. In this standalone mode, game console 102 allows one or more players to play games, watch movies, or listen to music. However, with the integration of broadband connectivity made available through the network interface 832, game console 102 may further be operated as a participant in online gaming, as discussed above.

It should be noted that although the game console discussed herein is described as a dedicated game console (not a general-purpose PC running computer games), the game console may also incorporate additional functionality. For example, the game console may include digital video recording functionality 5*so* that it can operate as a digital VCR, the game console may include channel tuning functionality so that it can tune and decode television signals (whether they be broadcast signals, cable signals, satellite signals, etc.), and so forth. Further, in alternate embodiments, the game console is replaced with a set top box or other computing device.

Specific examples discussed herein refer to one or more application programs (such as game applications) that monitor other application programs for suspected cheating and report such suspected cheating. In alternate embodiments, a separate monitoring application may be executed concurrently with a game application such that the monitoring application monitors the execution of the game application on other gaming systems. If the monitoring application identifies suspected cheating, the monitoring application reports the suspected cheating. This monitoring application may be provided by the game developer with the game application or may be provided by another entity, such as the gaming system developer.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method for preventing a computing system which generates false suspected cheating reports from participating in an online gaming service, the method comprising:

executing a first instance of a game application on a first computing system, wherein the first computing system is coupled to communicate with a second computing system executing a second instance of the game application;

monitoring execution of the second instance of the game application from the first computing system to identify suspected cheating by the second instance of the game application;

identifying suspected cheating by the second instance of the game application, wherein the identifying is performed by the first instance of the game application executing on the first computing system;

reporting from the first computing system the suspected cheating committed by the second instance of the game application executing on the second computing system;

determining a rate of suspected cheating reports generated by the first computing system;

determining a typical rate of suspected cheating reports generated by a computing system executing the game application by monitoring suspected cheating reports made by computing systems executing the game application during an initial period of time following release of the game application when cheating is unlikely to occur; and preventing the first computing system from participating in the online gaming service for a duration of time when the first computing system generates suspected cheating reports at a rate significantly greater than the typical rate.

2. A method as recited in claim 1 further comprising:
 monitoring execution of the first instance of the game application; and
 identifying suspected cheating by the first instance of the game application.

3. A method as recited in claim 1 wherein identifying suspected cheating by the second instance of the game application includes reporting the suspected cheating to the online gaming service.

4. A method as recited in claim 1 wherein identifying suspected cheating by the second instance of the game application includes reporting the suspected cheating to a cheater repository.

5. A method as recited in claim 1 further comprising:
 monitoring execution of a third instance of the game application on a third computing system, wherein the third computing system is coupled to communicate with the first computing system; and
 identifying suspected cheating by the third instance of the game application.

6. A method as recited in claim 1 wherein identifying suspected cheating includes detecting activities beyond the capability of the game application.

7. A method as recited in claim 1 wherein the first computing system is a game console.

8. A method as recited in claim 1 wherein the first computing system is a personal computer.

9. A method as recited in claim 1 wherein the first computing system is a set top box.

10. One or more computer-readable memories containing a computer program that is executable by a processor to perform the method recited in claim 1.

11. A method for preventing a computing system which generates false suspected cheating reports from participating in an online gaming service, the method comprising:
 executing a first instance of a game application on a first computing system, wherein the first computing system is coupled to communicate with a second computing system executing a second instance of the game application;
 the first computing system monitoring execution of the second instance of the game application and identifying suspected cheating by the second instance of the game application;
 the second computing system monitoring execution of the first instance of the game application and identifying suspected cheating by the first instance of the game application;
 reporting the suspected cheating identified by the first computing system;
 determining a rate of suspected cheating reports generated by the first computing system;
 determining a typical rate of suspected cheating reports generated by a computing system executing the game application by monitoring suspected cheating reports made by computing systems executing the game application during an initial period of time following release of the game application when cheating is unlikely to occur; and
 preventing the first computing system from participating in an the online gaming service for a duration of time when the first computing system generates suspected cheating reports at a rate significantly greater than the typical rate.

12. A method as recited in claim 11 further comprising the first computing system reporting suspected cheating to a cheating analyzer.

13. A method as recited in claim 11 further comprising the second computing system reporting suspected cheating to a cheating analyzer.

14. A method as recited in claim 11 further comprising the first computing system and the second computing system reporting suspected cheating to a cheater repository.

15. A method as recited in claim 11 wherein the first computing system and the second computing system are game consoles.

16. A method as recited in claim 11 wherein identifying suspected cheating includes detecting actions beyond the capability of the game application.

17. A method as recited in claim 11 wherein monitoring execution of the second instance of the game application and identifying suspected cheating by the second instance of the game application is performed without user interaction.

18. A method as recited in claim 11 wherein monitoring execution of the first instance of the game application and identifying suspected cheating by the first instance of the game application is performed without user interaction.

19. One or more computer-readable memories containing a computer program that is executable by a processor to perform the method recited in claim 11.

20. A method for preventing a game console which generates false suspected cheating reports from participating in an online gaming service, the method comprising:
 executing a first instance of a game application on a first game console, wherein the first game console is coupled to communicate with a second game console executing a second instance of the game application;
 the first instance of the game application monitoring execution of the second instance of the game application to identify suspected cheating by the second instance of the game application;
 the first instance of the game application identifying suspected cheating by the second instance of the game application and reporting the suspected cheating of the second game console;
 determining a rate of suspected cheating reports generated by the first instance of the game application;
 determining a typical rate of suspected cheating reports generated by an instance of the game application when executed on a game console by monitoring suspected cheating reports made by instances of the game application executing on game consoles during an initial period of time following release of the game application when cheating is unlikely to occur; and
 preventing the first game console from participating in the online gaming service for a duration of time when the first instance of the game application generates suspected cheating reports at a rate significantly greater than the typical rate.

21. A method as recited in claim 20 wherein the first instance of the game application is further monitoring execution of a third instance of the game application on a third game console and identifying suspected cheating by the second game console.

22. A method as recited in claim 20 further comprising:
 the second instance of the game application monitoring execution of the first instance of the game application; and
 the second instance of the game application identifying suspected cheating by the first game console and reporting the suspected cheating by the first game console.

23. A method as recited in claim 20 wherein identifying suspected cheating includes detecting activities beyond the capability of the game application.

24. A method as recited in claim 20 wherein identifying suspected cheating includes detecting movement of objects at a faster rate than permitted by the game application.

25. A method as recited in claim 20 wherein identifying suspected cheating includes detecting actions inconsistent with a typical performance of the game application.

26. One or more computer-readable memories containing a computer program that is executable by a processor to perform the method recited in claim 20.

27. A method for preventing a gaming system which generates false suspected cheating reports from participating in an online gaming service, the method comprising:
    executing a game application on a plurality of gaming systems, wherein the plurality of gaming systems are capable of communicating with one another;
    each of the plurality of gaming systems monitoring execution of the other gaming systems;
    each of the plurality of gaming systems identifying suspected cheating by any of the other gaming systems;
    determining a rate of suspected cheating reports generated by one game system of the plurality of gaming systems which are executing the game application;
    determining a typical rate of suspected cheating reports generated by a gaming system executing the game application by monitoring suspected cheating reports made by gaming systems executing the game application during an initial period of time following release of the game application when cheating is unlikely to occur; and
    preventing the one gaming system from participating in the online gaming service for a duration of time when the first one gaming system generates suspected cheating reports at a rate significantly greater than the typical rate.

28. A method as recited in claim 27 further comprising each of the plurality of gaming systems reporting suspected cheating to an online gaming service.

29. A method as recited in claim 28 wherein reporting suspected cheating includes identifying a gaming system suspected of cheating.

30. A method as recited in claim 28 wherein reporting suspected cheating includes identifying a cheat type.

31. A method as recited in claim 27 wherein identifying suspected cheating includes detecting activities that are inconsistent with the capabilities of the game application.

32. A method for preventing a computing system which generates false suspected cheating reports from participating in an online gaming service, the method comprising:
    executing a monitoring application on a first computing system, the monitoring application associated with a first instance of a game application;
    the monitoring application monitoring execution of a second instance of the game application on a second computing system coupled to communicate with the first computing system;
    the monitoring application identifying suspected cheating by the second instance of the game application on the second computing system;
    determining a rate of suspected cheating reports generated by the first computing system;
    determining a typical rate of suspected cheating reports generated by a computing system executing the game application by monitoring suspected cheating reports made by computing systems executing the game application during an initial period of time following release of the game application when cheating is unlikely to occur; and
    preventing the first computing system from participating in the online gaming service for a duration of time when the first computing system generates suspected cheating reports at a rate significantly greater than the typical rate.

33. A method as recited in claim 32 further comprising the monitoring application monitoring execution of a second third instance of the game application on a third computing system coupled to communicate with the first computing system.

34. A method as recited in claim 32 wherein identifying suspected cheating includes detecting movement of objects at a faster rate than permitted by the game application.

35. A method as recited in claim 32 wherein identifying suspected cheating includes detecting actions inconsistent with a typical performance of the game application.

36. One or more computer-readable memories containing a computer program that is executable by a processor to perform the method recited in claim 32.

37. A method for preventing computing systems which generate false suspected cheating reports from participating in an online gaming service, the method comprising:
    identifying data associated with reports of suspected cheating submitted by a plurality of computing systems executing a game application;
    determining a typical rate of suspected cheating reports generated by a computing system executing the game application by monitoring suspected cheating reports made by computing systems executing the game application during an initial period of time following release of the game application when cheating is unlikely to occur;
    identifying computing systems generating suspected cheating reports at a rate significantly in excess of the typical rate; and
    preventing the identified computing systems from executing any game application through the online gaming service.

38. A method as recited in claim 37 further comprising deleting any suspected cheating reports generated by the identified computing systems.

39. One or more computer-readable memories containing a computer program that is executable by a processor to perform the method recited in claim 37.

40. A method for preventing gaming consoles which generate false suspected cheating reports from participating in an online gaming service, the method comprising:
    identifying data associated with reports of suspected cheating submitted by a plurality of game consoles;
    determining a typical rate of suspected cheating reports generated by a game console by monitoring suspected cheating reports made by game consoles executing the game application during an initial period of time following release of the game application when cheating is unlikely to occur;
    identifying game consoles generating suspected cheating reports at a rate significantly greater than the typical rate; and
    preventing the identified game consoles from participating in the online gaming service.

41. A method as recited in claim 40 wherein the reports of suspected cheating submitted by the plurality of game consoles are associated with a particular game application.

42. A method as recited in claim 40 wherein preventing identified game consoles from participating in an online gaming service prevents all users of the identified game consoles from participating in the online gaming service.

43. A method as recited in claim 40 further comprising deleting any suspected cheater reports generated by the identified game consoles.

44. One or more computer-readable memories containing a computer program that is executable by a processor to perform the method recited in claim 40.

45. An apparatus comprising:
   means for executing a first instance of a game application on a first computing system;
   means for executing a second instance of the game application on a second computing system, wherein the second computing system is coupled to communicate with the first computing system;
   means for identifying suspected cheating committed by the second computing system, wherein the means for identifying the suspected cheating does not rely on software of the second computing system;
   means for reporting from the first computing system to an online gaming service, the suspected cheating of the second computing system;
   means for determining a rate of suspected cheating reports generated by the first computing system;
   means for determining a typical rate of suspected cheating reports generated by a computing system executing the game application by monitoring suspected cheating reports made by computing systems executing the game application during an initial period of time following release of the game application when cheating is unlikely to occur; and
   means for preventing the first computing system from participating in an online gaming service for a duration of time when the first computing system generates suspected cheating reports at a rate significantly greater than the typical rate.

46. An apparatus as recited in claim 45 further comprising:
   means for identifying suspected cheating committed by the first computing system; and
   means for reporting from the second computing system to the online gaming service, the suspected cheating of the first computing system.

47. An apparatus as recited in claim 45 further comprising means for storing reports of suspected cheating.

48. An apparatus as recited in claim 45 further comprising means for analyzing reports of suspected cheating.

49. One or more computer-readable media having stored thereon a computer program that, when executed by one or more processors, causes the one or more processors to:
   execute a first instance of a game application on a first computing system, wherein the first computing system is coupled to communicate with a second computing system executing a second instance of the game application;
   identify suspected cheating committed by the second instance of the game application, wherein the identifying of the suspected cheating is performed by the first instance of the game application executing on the first computing system, and wherein the identifying of the suspected cheating does not rely on software of the second computing system;
   report from the first computing system to an online gaming service any suspected cheating of the second instance of the game application;
   determine a rate of suspected cheating reports generated by the first computing system;
   determine a typical rate of suspected cheating reports generated by a computing system executing the game application by monitoring suspected cheating reports made by computing systems executing the game application during an initial period of time following release of the game application when cheating is unlikely to occur; and
   prevent the first computing system from participating in the online gaming service for a duration of time when the first computing system generates suspected cheating reports at a rate significantly greater than the typical rate.

50. One or more computer-readable media as recited in claim 49 wherein the one or more processors further identify suspected cheating by the first instance of the game application.

51. One or more computer-readable media as recited in claim 49 wherein the one or more processors further identify suspected cheating by the first instance of the game application and report any suspected cheating by the first instance of the game application to the online gaming service.

* * * * *